(12) United States Patent
Kamer

(10) Patent No.: US 10,988,865 B2
(45) Date of Patent: Apr. 27, 2021

(54) SYNTHETIC THREADS AND MATERIALS AND GARMENTS PRODUCED THEREWITH

(71) Applicant: Sason Kamer, Tel Aviv (IL)

(72) Inventor: Sason Kamer, Tel Aviv (IL)

( * ) Notice: Subject to any disclaimer, the term of this patent is extended or adjusted under 35 U.S.C. 154(b) by 325 days.

(21) Appl. No.: 15/592,280

(22) Filed: May 11, 2017

(65) Prior Publication Data
US 2018/0002838 A1    Jan. 4, 2018

Related U.S. Application Data

(60) Provisional application No. 62/334,508, filed on May 11, 2016.

(51) Int. Cl.
| | |
|---|---|
| *D02G 3/04* | (2006.01) |
| *A41D 7/00* | (2006.01) |
| *D01F 6/62* | (2006.01) |
| *D01F 6/74* | (2006.01) |
| *D02G 3/44* | (2006.01) |
| *G02B 5/22* | (2006.01) |
| *G02B 5/20* | (2006.01) |

(52) U.S. Cl.
CPC .............. *D02G 3/045* (2013.01); *D01F 6/62* (2013.01); *D01F 6/625* (2013.01); *D01F 6/74* (2013.01); *D02G 3/441* (2013.01); *A41D 7/00* (2013.01); *A41D 2400/28* (2013.01); *D10B 2331/04* (2013.01); *D10B 2331/041* (2013.01); *D10B 2331/14* (2013.01); *G02B 5/208* (2013.01); *G02B 5/223* (2013.01)

(58) Field of Classification Search
None
See application file for complete search history.

(56) References Cited

U.S. PATENT DOCUMENTS

| | | | | |
|---|---|---|---|---|
| 2003/0228812 | A1* | 12/2003 | Stanhope | B32B 5/26 442/49 |
| 2010/0151760 | A1* | 6/2010 | Laura, Jr. | B32B 27/12 442/364 |
| 2010/0152311 | A1* | 6/2010 | Booth | C08J 11/04 521/48 |

* cited by examiner

*Primary Examiner* — Shawn Mckinnon
(74) *Attorney, Agent, or Firm* — Vladimir Sherman; Professional Patent Solutions Ltd

(57) ABSTRACT

Disclosed is a thread combining multiple polymers. The thread consists of fibers of a first synthetic polymer of the Polyethylene terephthalate (PET) family and fibers of a second synthetic polymer of the Polyimide family, wherein the first fibers and the second fibers are combined together such that the resulting material, forming the thread, blocks photons with wavelengths falling within a first range of wavelengths and allows passage of photons with wavelengths falling within a second range of wavelengths. Photons whose wavelengths are within the second range of wavelengths, allowed to pass by the resulting material, may contribute to tanning of human skin.

15 Claims, 4 Drawing Sheets

SYNTHETIC THREADS AND MATERIALS AND GARMENTS PRODUCED THEREWITH

RELATED APPLICATIONS

The present invention claims the priority of applicant's U.S. Provisional Patent Application No. 62/334,508 filed May 11, 2016, which application is hereby incorporated by reference in its entirety.

FIELD OF THE INVENTION

The present invention generally relates to the field of synthetic materials. More specifically, the present invention relates to synthetic threads, and materials and garments produced using the synthetic threads.

BACKGROUND

A tan line is a visually clear division on the human skin between an area of pronounced comparative paleness relative to other areas that have been suntanned by exposure to ultraviolet (UV) radiation. The source of the radiation may be the sun, or artificial UV sources such as tanning lamps. Tan lines are usually an inadvertent result of a work environment or of recreational activities, but are sometimes intentional. Many people regard visible tan lines as un-aesthetic and embarrassing, and seek to avoid tan lines that will be visible.

Garments made of material that can visually conceal or block visibility of portions of a wearer's skin while allowing tanning of those portions is desirable. No naturally known material have this optical characteristic. Synthetic fibers are the result of extensive research by scientists to improve on naturally occurring animal and plant fibers. In general, synthetic fibers are created by extruding fiber forming materials through spinnerets into air and water, forming a thread. Artificially manufactured fibers may be made from polymers obtained from petro chemicals. These fibers are called synthetic or artificial fibers. Some fibers are manufactured from plant-derived cellulose.

There is a need in the fields of material for garments for improved methods and technologies for producing fibers, threads and materials having specific photonic transmissivity.

SUMMARY OF THE INVENTION

The present invention includes methods, circuits, devices, systems and functionally associated computer executable code for producing synthetic threads, materials and garments with specific photonic transmissivity. According to some embodiments, two or more synthetic materials may be combined, for example fused together, to produce a thread adapted to block photons with wavelengths falling within a first range of wavelengths and to allow passage of photons with wavelengths falling within a second range of wavelengths. Photons whose wavelengths are within the second range of wavelengths, allowed to pass by a material according to embodiments, may contribute to tanning of human skin.

A thread according to embodiments of the present invention may be produced by combining the fibers of two or more polymer, for example under high pressure and high temperature conditions. The term combining may include mixing, fusing, sintering, hot compression molding, direct forming, and isostatic pressing. According to some embodiments the first synthetic material may be a polymer of the Polyethylene terephthalate (PET) category or family. According to further embodiments, the second synthetic material may be a polymer of the Polyimide category or family.

The combination of fibers and their respective indices of refraction, may collectively form a photonic bandpass filter which blocks photons in the visible range while permitting passage of photons in the UV range relevant for tanning.

Polyethylene terephthalate (sometimes written poly(ethylene terephthalate)), commonly abbreviated PET, PETE, or the obsolete PETP or PET-P, is the most common thermoplastic polymer resin of the polyester family and is used in fibers for clothing, containers for liquids and foods, thermoforming for manufacturing, and in combination with glass fiber for engineering resins. PET consists of polymerized units of the monomer ethylene terephthalate, with repeating $(C10H8O4)$ units.

Polyimide (sometimes abbreviated PI) is a polymer of imide monomers. Polyimides have been in mass production since 1955. With their high heat-resistance, polyimides enjoy diverse applications in applications demanding rugged organic materials, e.g. high temperature fuel cells, displays, and various military roles. A classic polyimide is Kapton, which is produced by condensation of pyromellitic dianhydride and 4,4'-oxydianiline.

According to embodiments, a PET may be combined with polyimide according to a roughly 65% to 35% ratio. The two materials may be heat pressed or fused together at roughly 320 Degrees centigrade, and optionally within an oxygen depleted environment (e.g. in a vacuum). According to some embodiments, the polyimide material may be polyimide (8).

According to further embodiments, the combined polymer fibers may be formed in garment threads, which garment threads may be woven into a garment fabric. The garment fabric may be suitable as a swimsuit or bikini fabric. The woven fabric may be cut and used to produce a garment, such as a swimsuit or a bikini. According to some embodiments, the garment may be a tan-through garment, concealing a wearer's skin while allowing for the skin to tan when the wearer is exposed to sunlight.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to this description when read with the accompanying drawings in which:

FIGS. 1A to 1B show exemplary synthetic fibers used in the production of threads according to embodiments of the present invention, wherein: FIG. 1A shows; and FIG. 1B shows;

FIGS. 2A & 2B show other exemplary fibers used in the production of threads according to embodiments of the preset invention, wherein: FIG. 2A shows; and FIG. 2B shows;

Figure 1B:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DESCRIPTION OF INVENTION

Within the following description, numerous specific details were set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Functions, operations, components and/or features described herein with reference to one or more embodiments, may be combined or otherwise utilized with one or more other functions, operations, components and/or features described herein with reference to one or more other embodiments, or vice versa. While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

The present invention includes methods, circuits, devices, systems and functionally associated computer executable code for producing synthetic threads, materials and garments with specific photonic transmissivity. According to some embodiments, two or more synthetic materials may be combined, for example fused together, to produce a thread adapted to block photons with wavelengths falling within a first range of wavelengths and to allow passage of photons with wavelengths falling within a second range of wavelengths. Photons whose wavelengths are within the second range of wavelengths, allowed to pass by a material according to embodiments, may contribute to tanning of human skin.

A thread according to embodiments of the present invention may be produced by combining the fibers of two or more polymer, for example under high pressure and high temperature conditions. The term combining may include mixing, fusing, sintering, hot compression molding, direct forming, and isostatic pressing. According to some embodiments the first synthetic material may be a polymer of the Polyethylene terephthalate (PET) category or family. According to further embodiments, the second synthetic material may be a polymer of the Polyimide category or family.

The combination of fibers and their respective indices of refraction, may collectively form a photonic bandpass filter which blocks photons in the visible range while permitting passage of photons in the UV range relevant for tanning.

Polyethylene terephthalate (sometimes written poly(ethylene terephthalate)), commonly abbreviated PET, PETE, or the obsolete PETP or PET-P, is the most common thermoplastic polymer resin of the polyester family and is used in fibers for clothing, containers for liquids and foods, thermoforming for manufacturing, and in combination with glass fiber for engineering resins. PET consists of polymerized units of the monomer ethylene terephthalate, with repeating $(C_{10}H_8O_4)$ units.

The majority of the world's PET production is for synthetic fibers (in excess of 60%), with bottle production accounting for about 30% of global demand. In the context of textile applications, PET is referred to by its common name, polyester, whereas the acronym PET is generally used in relation to packaging. Polyester makes up about 18% of world polymer production and is the fourth-most-produced polymer; polyethylene (PE), polypropylene (PP) and polyvinyl chloride (PVC) are first, second and third, respectively.

Depending on its processing and thermal history, polyethylene terephthalate may exist both as an amorphous (transparent) and as a semi-crystalline polymer. The semi-crystalline material might appear transparent (particle size <500 nm) or opaque and white (particle size up to a few micrometers) depending on its crystal structure and particle size. Its monomer bis(2-hydroxyethyl) terephthalate can be synthesized by the esterification reaction between terephthalic acid and ethylene glycol with water as a byproduct, or by transesterification reaction between ethylene glycol and dimethyl terephthalate with methanol as a byproduct. Polymerization is through a polycondensation reaction of the monomers (done immediately after esterification/transesterification) with water as the byproduct.

Figure 1A:

In FIGS. 1A and 1B, exemplary Polyethylene terephthalate fibers, in accordance with some embodiments of the present invention, can be seen.

Polyimide (sometimes abbreviated PI) is a polymer of imide monomers. Polyimides have been in mass production since 1955. With their high heat-resistance, polyimides enjoy diverse applications in applications demanding rugged organic materials, e.g. high temperature fuel cells, displays, and various military roles. A classic polyimide is Kapton, which is produced by condensation of pyromellitic dianhydride and 4,4'-oxydianiline.

Thermosetting polyimides are known for thermal stability, good chemical resistance, excellent mechanical properties, and characteristic orange/yellow color. Polyimides compounded with graphite or glass fiber reinforcements have flexural strengths of up to 50,000 psi (340 MPa) and flexural moduli of 3,000,000 psi (21,000 MPa). Thermoset polyimides exhibit very low creep and high tensile strength. These properties are maintained during continuous use to temperatures of up to 452° C. (846° F.) and for short excursions, as high as 704° C. (1,299° F.). Molded polyimide parts and laminates have very good heat resistance. Normal operating temperatures for such parts and laminates range from cryogenic to those exceeding 260° C. (500° F.). Polyimides are also inherently resistant to flame combustion and do not usually need to be mixed with flame retardants. Most carry a UL rating of VTM-0. Polyimide laminates have a flexural strength half-life at 249° C. (480° F.) of 400 hours.

Typical polyimide parts are not affected by commonly used solvents and oils—including hydrocarbons, esters, ethers, alcohols and freons. They also resist weak acids but are not recommended for use in environments that contain alkalis or inorganic acids. Some polyimides, such as CP1 and CORIN XLS, are solvent-soluble and exhibit high optical clarity. The solubility properties lend them towards spray and low temperature cure applications.

Polyimide materials are lightweight, flexible, resistant to heat and chemicals. Therefore, they are used in the electronics industry for flexible cables, as an insulating film on magnet wire and for medical tubing. For example, in a laptop computer, the cable that connects the main logic board to the display (which must flex every time the laptop is opened or closed) is often a polyimide base with copper conductors. Examples of polyimide films include Apical, Kapton, UPILEX, VTEC PI, Norton TH and Kaptrex.

Figure 2A:
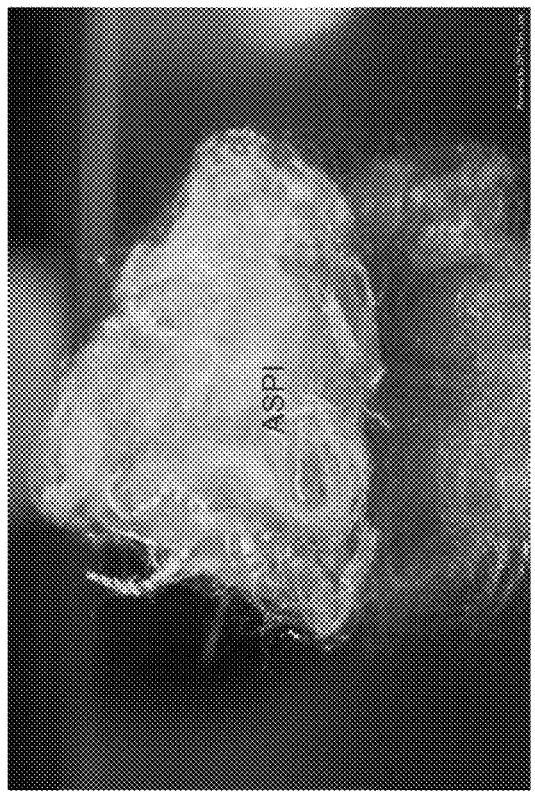
Figure 2B:
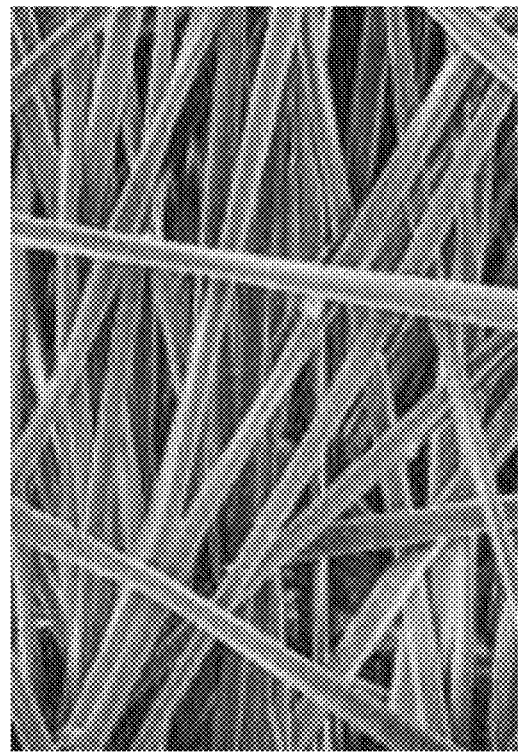

In FIGS. 2A and 2B, exemplary Polyimide fibers, in accordance with some embodiments of the present invention, can be seen.

According to embodiments, a PET may be combined with polyimide according to a roughly 65% to 35% ratio. The two materials may be heat pressed or fused together at roughly 320 Degrees centigrade, and optionally within an oxygen depleted environment (e.g. in a vacuum). According to some embodiments, the polyimide material may be polyimide (8).

Figure 3:
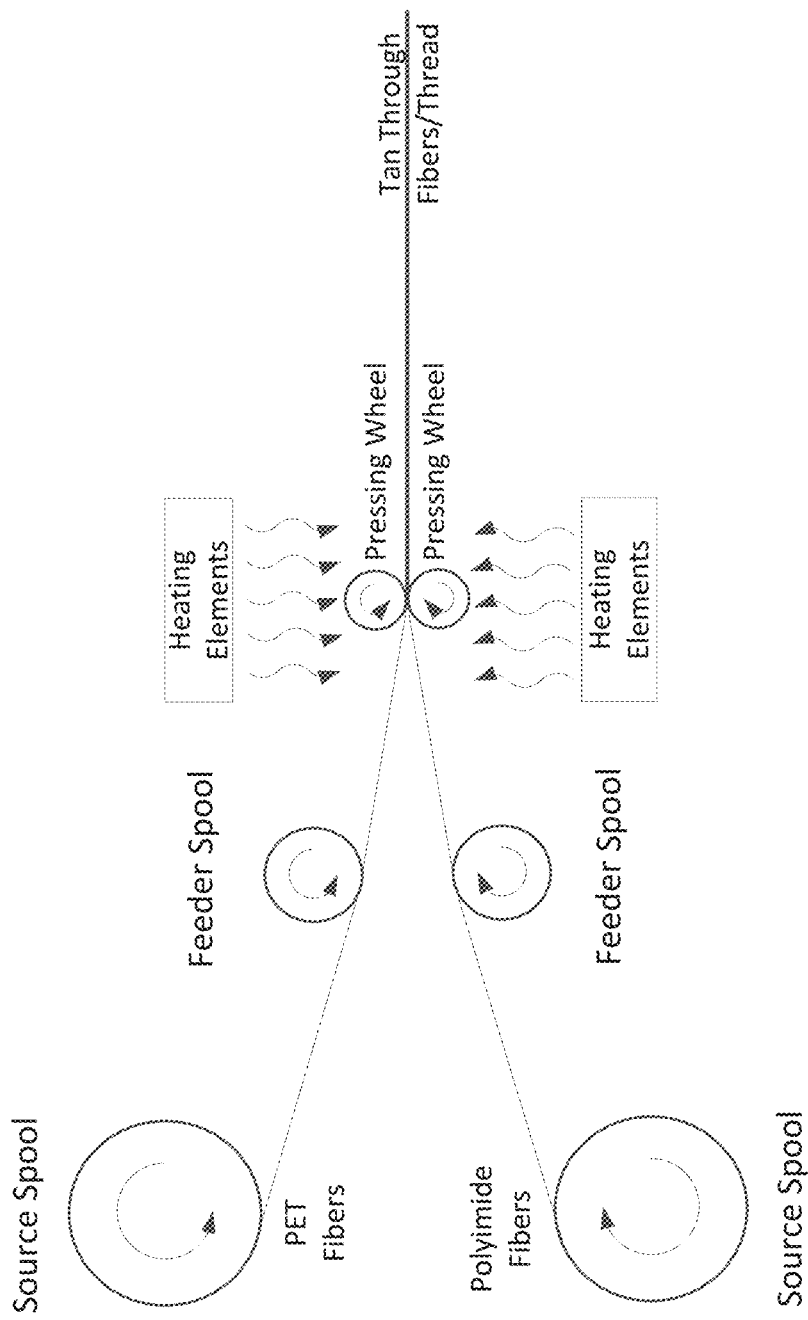
FIG. 3 shows an exemplary schematic production line, of a thread in accordance with some embodiments of the present invention.

In FIG. 3 there is shown, an exemplary schematic production line, of a thread in accordance with some embodiments of the present invention. In the figure there are shown: a source spool of PET fibers; a source spool of Polyimide fibers; two respective feeder spools—for each of the fibers' source spools; two respective pressing wheels—for each of the fibers' feeder spools—for bringing the two fibers together and pressing them to combine into the resulting tan through thread shown; and, heating elements to heat the environment at, around and/or at-the-proximity-of the pressing wheels, facilitating the heat pressing process of combining the two fibers types into a thread.

Figure 4:
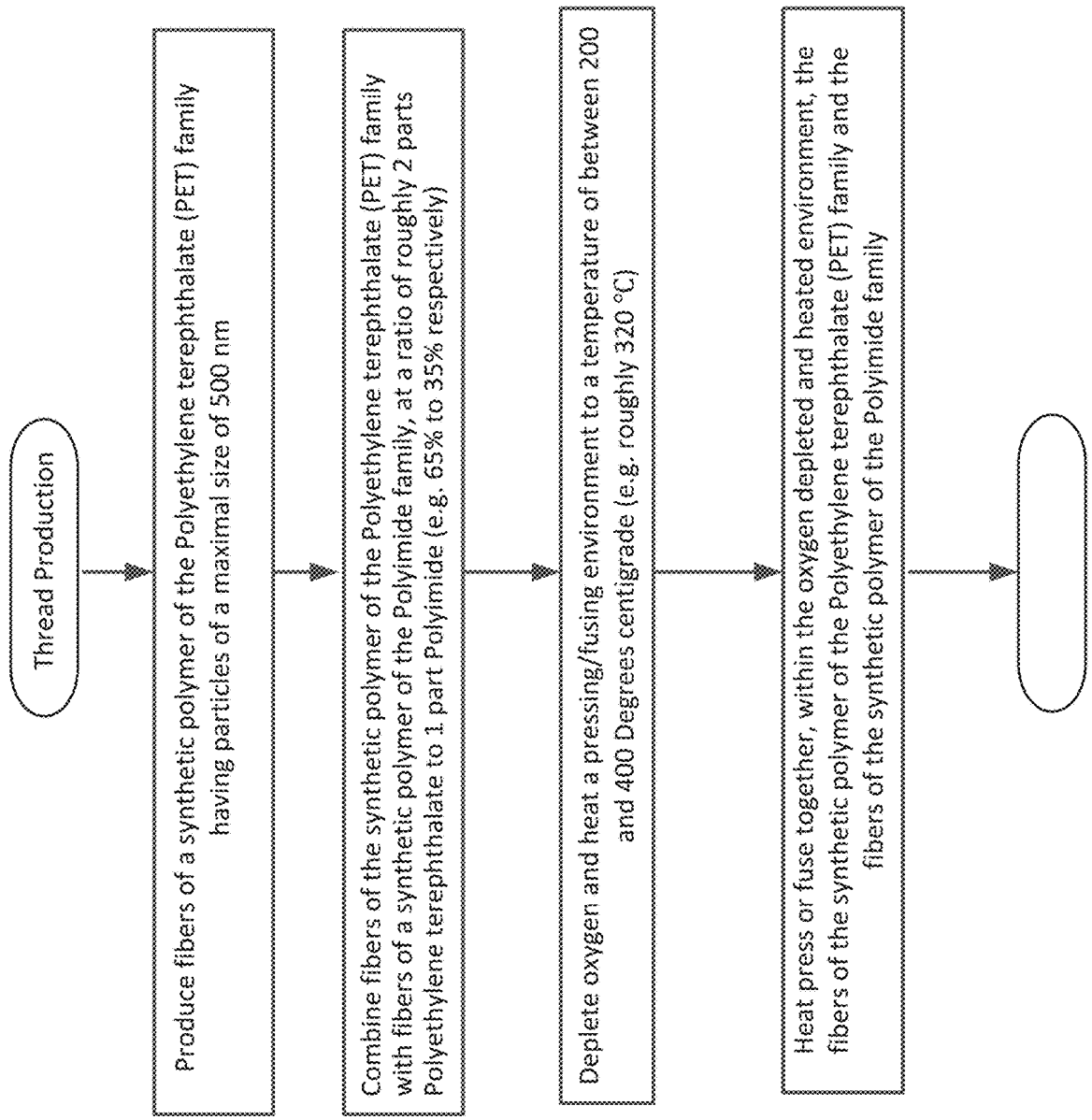
FIG. 4 shows a flowchart of the main method steps executed as part of an exemplary process of producing a thread, in accordance with embodiments of the present invention.

In FIG. 4 there are shown, the steps of an exemplary production process, of a thread in accordance with some embodiments of the present invention. The production method steps shown in the figure include: producing fibers of a synthetic polymer of the Polyethylene terephthalate (PET) family having particles of a maximal size of 500 nm; combining fibers of the synthetic polymer of the Polyethylene terephthalate (PET) family with fibers of a synthetic polymer of the Polyimide family, at a ratio of roughly 2 parts Polyethylene terephthalate to 1 part Polyimide (e.g. 65% to 35% respectively); depleting at least some of the oxygen from a pressing/fusing environment and heating up the pressing/fusing environment to a temperature of between 200 and 400 degrees centigrade (e.g. roughly 320° C.); and, heat pressing or fusing together, within the oxygen depleted and heated environment, the fibers of the synthetic polymer of the Polyethylene terephthalate (PET) family and the fibers of the synthetic polymer of the Polyimide family, to yield a thread adapted to block photons with wavelengths falling within a first range of wavelengths and to allow passage of photons with wavelengths falling within a second range of wavelengths.

According to further embodiments, the combined polymer fibers may be formed in garment threads, which garment threads may be woven into a garment fabric. The garment fabric may be suitable as a swimsuit or bikini fabric. The woven fabric may be cut and used to produce a garment, such as a swimsuit or a bikini. According to some embodiments, the garment may be a tan-through garment, concealing a wearer's skin while allowing for the skin to tan when the wearer is exposed to sunlight.

According to some embodiments of the present invention, a thread may combine multiple polymers, including at least fibers of a first synthetic polymer of the Polyethylene terephthalate (PET) family and fibers of a second synthetic polymer of the Polyimide family. The first fibers and the second fibers may be combined together such that the resulting material, forming the thread, may block photons with wavelengths falling within a first range of wavelengths and allow passage of photons with wavelengths falling within a second range of wavelengths. According to some embodiments, photons whose wavelengths are within the second range of wavelengths, allowed to pass by the resulting material, may contribute to tanning of human skin.

According to some embodiments, the manner of combining the fibers of the first synthetic polymer and the fibers of the second synthetic polymer may be selected from the group consisting of: heat pressing, fusing, mixing, sintering, hot compression molding, direct forming and isostatic pressing.

According to some embodiments, the fibers of the first synthetic polymer of the Polyethylene terephthalate (PET) family may consist of particles of a maximal size of 500 nm. According to some embodiments, the monomer 'bis(2-hydroxyethyl) terephthalate' of the fibers of a first synthetic polymer of the Polyethylene terephthalate (PET) family, may be synthesized by the esterification reaction between terephthalic acid and ethylene glycol with water as a byproduct. According to some embodiments, the monomer 'bis(2-hydroxyethyl) terephthalate' of the fibers of a first synthetic polymer of the Polyethylene terephthalate (PET) family, may be synthesized by the transesterification reaction between ethylene glycol and dimethyl terephthalate with methanol as a byproduct.

According to some embodiments, polymerization of the monomers may be yielded through: a polycondensation reaction of the monomers performed after esterification; and/or a polycondensation reaction of the monomers performed after transesterification.

According to some embodiments, the polyimide material, of the fibers of a second synthetic polymer of the Polyimide family, may be polyimide (8) or kapton. According to some embodiments, Kapton may be produced by condensation of pyromellitic dianhydride and 4,4'-oxydianiline. According to some embodiments, the polyimide material may be compounded with graphite or glass fiber reinforcements.

According to some embodiments of the present invention, a clothing tan-through garment, may consist of fabric woven of threads, wherein the woven threads combine fibers of a first synthetic polymer of the Polyethylene terephthalate (PET) family and fibers of a second synthetic polymer of the Polyimide family; and wherein the first fibers and the second fibers are combined together such that the resulting material, forming the woven threads, blocks photons with wavelengths falling within a first range of wavelengths and allows passage of photons with wavelengths falling within a second range of wavelengths. According to some embodiments, photons whose wavelengths are within the first range of wavelengths, may be blocked by the woven threads, concealing the skin of a human wearer of the clothing tan-through garment. According to some embodiments, photons whose wavelengths are within the second range of wavelengths, may be allowed to pass by the woven threads, contributing to the tanning of the skin of a sunlight exposed human wearer of the clothing tan-through garment.

According to some embodiments of the present invention, a method for producing a thread may include: combining fibers of a first synthetic polymer of the Polyethylene terephthalate (PET) family with fibers of a second synthetic polymer of the Polyimide family at a ratio of roughly 65% to 35%, respectively, wherein the polyethylene terephthalate is made of particles of a maximal size of 500 nm; and heat pressing or fusing together the fibers of the first synthetic polymer and the fibers of the second synthetic polymer at a temperature of roughly 320 Degrees centigrade such that the produced thread is adapted to block photons with wavelengths falling within a first range of wavelengths and to allow passage of photons with wavelengths falling within a second range of wavelengths. According to some embodiments, heat pressing or fusing may be performed in an oxygen depleted or vacuumed environment.

The invention claimed is:

1. A woven sheet of threads, said threads consisting of:
A fiber of a first synthetic polymer of the Polyethylene terephthalate (PET) family, consisting of particles of a maximal size of 500 nm and with an intrinsic viscosity range of 0.40-0.70;
side-by-side with a fiber of a second synthetic polymer, permeable to passage of photons with wavelengths falling within a range of 280 to 400 nm, of the Polyimide family, wherein said first fiber and said second fiber are fused together such that the resulting material, forming said thread, blocks photons with wavelengths falling within a first range of wavelengths and allows passage of photons with wavelengths falling within a second range of wavelengths; wherein said thread has a ratio of 65:35 of polyethylene terephthalate:polyimide.

2. The thread according to claim 1 wherein photons whose wavelengths are within the second range of wavelengths, allowed to pass by the resulting material, contribute to tanning of human skin.

3. The thread according to claim 1 wherein the manner of fusing said fiber of the first synthetic polymer and said fiber of the second synthetic polymer is selected from the group consisting of: heat pressing, sintering, hot compression molding, direct forming and isostatic pressing.

4. The thread according to claim 3 wherein the monomer 'bis(2-hydroxyethyl) terephthalate' of said fiber, of a first synthetic polymer of the Polyethylene terephthalate (PET) family, is synthesized by the esterification reaction between terephthalic acid and ethylene glycol with water as a byproduct.

5. The thread according to claim 3 wherein the monomer 'bis(2-hydroxyethyl) terephthalate' of said fiber, of a first synthetic polymer of the Polyethylene terephthalate (PET) family, is synthesized by the transesterification reaction between ethylene glycol and dimethyl terephthalate with methanol as a byproduct.

6. The thread according to claim 4 wherein polymerization of the monomers is yielded through a polycondensation reaction of the monomers performed after esterification.

7. The thread according to claim 5 wherein polymerization of the monomers is yielded through a polycondensation reaction of the monomers performed after transesterification.

8. The thread according to claim 1 wherein the polyimide material, of said fiber of a second synthetic polymer of the Polyimide family, is polyimide(8), Kapton, UPILEX, VTEC PI, Norton TH, CORIN XLS, or Kaptrex.

9. The thread according to claim 8 wherein the Kapton is produced by condensation of pyromellitic dianhydride and 4,4'-oxydianiline.

10. The thread according to claim 8 wherein the polyimide material is compounded with graphite or glass fiber reinforcements.

11. A clothing tan-through garment, said garment at least partially consisting of:
a woven sheet of threads, wherein said woven threads are produced by fusing a fiber of a first synthetic polymer of the Polyethylene terephthalate (PET) family, consisting of particles of a maximal size of 500 nm and with an intrinsic viscosity range of 0.40-0.70, side-by-side with a fiber of a second synthetic polymer of the Polyimide family, permeable to passage of photons with wavelengths falling within a range of 280 to 400 nm; and wherein said first fiber and said second fiber are fused together such that the resulting material, forming said woven thread, blocks photons with wavelengths falling within a first range of wavelengths and allows passage of photons with wavelengths falling within a second range of wavelengths; wherein said thread has a ratio of 65:35 of polyethylene terephthalate:polyimide.

12. The clothing tan-through garment of claim 11, wherein photons whose wavelengths are within the first range of wavelengths, are blocked by said woven threads, concealing the skin of a human wearer of said clothing tan-through garment.

13. The clothing tan-through garment of claim 12, wherein photons whose wavelengths are within the second range of wavelengths, are allowed to pass by said woven threads, contributing to the tanning of the skin of a sunlight exposed human wearer of said clothing tan-through garment.

14. A method for producing a woven sheet of threads, said method including:
fusing a fiber of a first synthetic polymer of the Polyethylene terephthalate (PET) family, with an intrinsic viscosity range of 0.40-0.70, side-by-side with a fiber of a second synthetic polymer of the Polyimide family, permeable to passage of photons with wavelengths falling within a range of 280 to 400 nm, at a ratio of roughly 65% to 35%, respectively, wherein the polyethylene terephthalate is made of particles of a maximal size of 500 nm; and heat pressing or fusing together the fiber of the first synthetic polymer and the fiber of the second synthetic polymer at a temperature of 320 Degrees centigrade such that the produced thread is adapted to block photons with wavelengths falling within a first range of wavelengths and to allow passage of photons with wavelengths falling within a second range of wavelengths.

15. The method according to claim 14, wherein heat pressing or fusing is performed in an oxygen depleted or vacuumed environment.

* * * * *